No. 864,158. PATENTED AUG. 27, 1907.
E. H. DE LANY.
SEPARATOR.
APPLICATION FILED MAY 11, 1906.
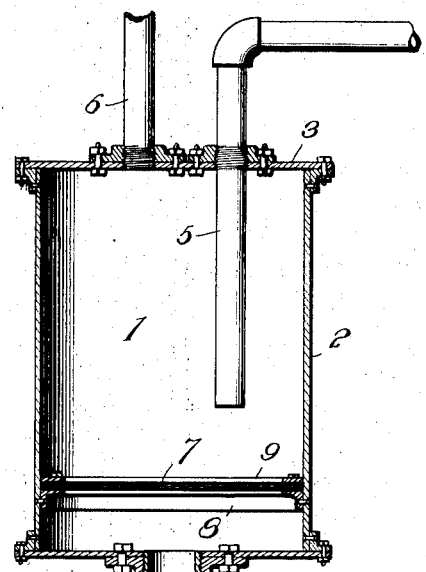
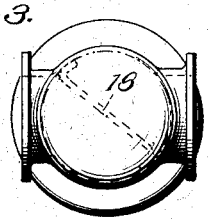

UNITED STATES PATENT OFFICE.

EDWIN H. DE LANY, OF CLEVELAND, TENNESSEE.

SEPARATOR.

No. 864,158.      Specification of Letters Patent.      Patented Aug. 27, 1907.

Application filed May 11, 1906. Serial No. 316,306.

*To all whom it may concern:*

Be it known that I, EDWIN H. DE LANY, a citizen of the United States, residing at Cleveland, in the county of Bradley and State of Tennessee, have invented certain new and useful Improvements in Separators; and I do hereby declare the following to be a full, clear, and exact description of the invention, such as will enable others skilled in the art to which it appertains to make and use the same.

My invention relates to certain new and useful improvements in separators, and the object of my invention is to produce a separator in which the liquid contained in the vapor may be separated therefrom.

In the following description and in the claims appended hereto, I will refer specifically to the use of my invention in connection with separating water from steam, but it is to be understood that it is equally adapted for separating any other liquid, such for instance as oil from steam, or for separating a liquid from any other vapor. I will merely refer to steam and water for the sake of brevity, and it will be understood that I mean to include and cover all other liquids and vapors.

My invention consists in providing a chamber with inlet and outlet openings for the steam or vapor, and locating in the chamber a perforated diaphragm in position to deflect the entering vapor toward the exit, the openings in the diaphragm being of such fineness as to permit of the passage of the liquid through the openings in the diaphragm, but to prevent the passage of the vapor. It is well known that a vapor has the peculiarity of not passing through fine openings, such for instance as occur in a fine mesh screen, through which a liquid, such as water, will readily pass, and it is this physical fact which I will make use of in my invention.

Referring to the drawings, wherein I illustrate two forms of my invention, and wherein the same part is designated by the same reference numeral wherever it occurs, Figure 1 is a central longitudinal section of a separator made in accordance with my invention; Fig. 2 is a central longitudinal section of a modified form of separator; Fig. 3 is a top plan view of the construction shown in Fig. 2.

Referring specifically to Fig. 1, 1 designates a chamber which is shown as being cylindrical in form, and composed of a side wall 2, a top 3 and a bottom 4, the top and bottom being secured to the side wall by the ordinary flange and bolt construction. The top 2 is provided with an opening, through which passes an inlet pipe 5, the pipe as shown extending somewhat more than half way down toward the bottom of the chamber.

6 designates an outlet pipe, the inner end of which being shown as flush with the top of the chamber.

7 indicates the diaphragm which, as shown, is formed of a plurality of thicknesses of fine mesh wire gauze. This diaphragm is supported in position in the chamber by being clamped between rings 8 and 9 and, consequently, divides the chamber into two parts, preferably, and as shown, the part below the diaphragm being smaller than the portion above.

10 indicates a trap which is tapped into the bottom 4 of the chamber, and is adapted to catch the liquid separated out from the vapor by the action of the diaphragm. I have shown this trap as being provided with an ordinary water glass 11, and a drain 12 provided with a suitable cock 13.

Referring to Fig. 2 wherein I show a form of separator which is particularly adapted for use on the main steam pipes leading from the boilers to the engine, 14 designates a chamber which is provided at its upper end with a head 15, having diametrically opposed openings 16 and 17, into which the pipes forming the main steam line are secured. 18 designates a baffle-plate which, preferably, and as more clearly shown in Fig. 3, is diagonally located in the head 15, between the inlet and outlet openings.

19 is the diaphragm located in the lower portion of the chamber 14, and the diaphragm is preferably constructed similar to the diaphragm 7 shown in Fig. 1, and similarly supported. Attached to the lower part of the chamber is the trap 10, similar to the trap shown and described in connection with Fig. 1.

In the operation of my invention the steam or other vapor enters the inlet pipe which, in the form shown in Fig. 1, is the pipe 5, and in the form shown in Figs. 2 and 3, the pipe 16. In the form shown in Figs. 2 and 3, the steam is deflected by the baffle-plate against the diaphragm. It then passes upward and to the outlet openings. In being deflected by the diaphragms 7 or 19, the steam or vapor rebounds and passes up to the outlet pipe without passing through the diaphragm. Any water or other liquid carried by the steam or vapor will however pass through the meshes of the diaphragm and enter the trap, from which they can be drawn off from time to time.

While I have described what I believe to be the preferred form of my invention, I desire to have it understood that many changes may be made in the form, construction and arrangement of parts without departing from the spirit of my invention.

What I claim as new and desire to secure by Letters Patent is:

1. In a separator for steam or other vapor, the combination with a chamber provided with inlet and outlet openings, of a diaphragm formed of a plurality of layers of fine mesh wire gauze.

2. In a separator for steam or other vapor, the combination with a chamber provided with inlet and outlet openings, of a steam and liquid-separating diaphragm located in the chamber in position to deflect the entering vapor toward the outlet, said diaphragm being provided with openings of such fineness as to deflect the vapor but permit the passage through the openings of any liquid carried by the vapor, said inlet opening being adapted to cause the entering vapor to impinge upon said diaphragm with sufficient velocity to effect the separation.

3. In a separator for steam or other vapor, the combination with a chamber provided with inlet and outlet openings located in the upper portion of the chamber, of a steam and liquid separating diaphragm located in the lower portion of the chamber, the inlet and outlet openings being so located in relation to the diaphragm as to cause the diaphragm to deflect the entering vapor toward the outlet opening, said diaphragm being provided with openings of such fineness as to deflect the vapor but to permit the passage through the openings of any liquid carried by the vapor and said inlet opening being adapted to cause the entering steam or vapor to impinge upon said diaphragm with sufficient velocity to effect the separation.

4. In a separator for steam or other vapor, the combination with a chamber provided with inlet and outlet openings, of a steam and liquid separating diaphragm having a mesh of such fineness as to deflect the vapor but permit the passage through the mesh of any liquid carried by the vapor, and said inlet opening being adapted to cause the entering steam or vapor to impinge upon said diaphragm with sufficient velocity to effect the separation.

5. In a separator for steam or other vapor, the combination with a chamber provided with an inlet pipe which extends into the chamber and an outlet pipe the inner end of which is flush with the wall of the chamber, of a steam and liquid separating diaphragm located below the end of the inlet pipe and in position to deflect the entering vapor toward the outlet, said diaphragm being provided with openings of such fineness as to deflect the vapor but permit the passage through the openings of any liquid carried by the vapor and said inlet opening being adapted to cause the entering steam or vapor to impinge upon said diaphragm with sufficient velocity to effect the separation.

In testimony whereof I affix my signature, in presence of two witnesses.

EDWIN H. DE LANY.

Witnesses:
JOHN A. RODGERS,
JOSEPH SARFATY.